O. GREINER.
PRODUCTION OF ARTICLES FROM REFRACTORY MATERIAL.
APPLICATION FILED NOV. 23, 1912.
1,077,704.
Patented Nov. 4, 1913.
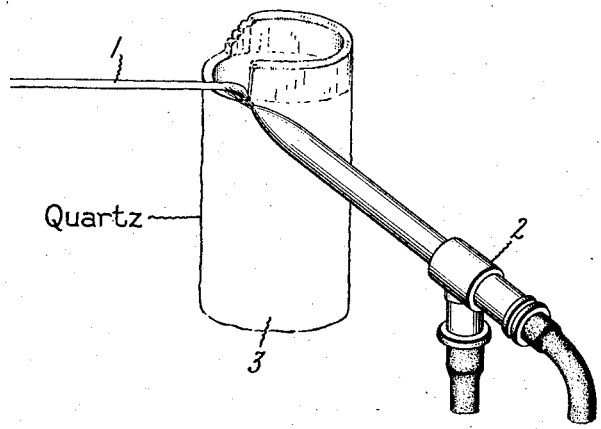
Witnesses:
George W. Tilden
J. Ellis Glen.
Inventor:
Otto Greiner,
by Albert G. Davis
His Attorney.

UNITED STATES PATENT OFFICE.

OTTO GREINER, OF LYNN, MASSACHUSETTS, ASSIGNOR TO GENERAL ELECTRIC COMPANY, A CORPORATION OF NEW YORK.

PRODUCTION OF ARTICLES FROM REFRACTORY MATERIAL.

1,077,704.   Specification of Letters Patent.   Patented Nov. 4, 1913.

Application filed November 23, 1912. Serial No. 733,028.

*To all whom it may concern:*

Be it known that I, OTTO GREINER, a citizen of the United States, residing at Lynn, county of Essex, State of Massachusetts, have invented certain new and useful Improvements in the Production of Articles from Refractory Material, of which the following is a specification.

In the manufacture of tubes and other articles from refractory material, such as silica, it is necessary to work at such high temperatures that the ordinary glass blowing processes cannot be used. According to the method commonly employed in quartz working, thin rods or canes of fused native quartz are first prepared. These are worked up in the blow-pipe or electric arc to the required form. In the preparation of articles, such as tubes, the practice has been to wind a thread of softened quartz obtained in the flame at the heated end of the cane, spirally upon the end of a quartz tube thus building it up. Tubes produced in this manner, however, contain rings and ridges even after being subjected to repeated reheating, blowing and drawing.

In accordance with my present invention clear uniform tubes are produced by applying the thread of softened quartz longitudinally of the tube, or, in other words, the material is wound with a zigzag motion in a direction parallel with the axis of the structure being built up.

My invention may be better understood from the accompanying drawing which shows how the thin rod 1 of previously fused quartz or other refractory material, is applied in the flame of the oxygen blow-pipe 2 to the end of quartz tube 3, with an up and down or reciprocating stroke, a so-called "knitting" motion. The quartz is usually applied from rods about $\frac{1}{16}$ to $\frac{1}{8}''$ in diameter but the size of the rods will vary with the working conditions and character of the apparatus to be made. The length of the stroke may be varied within wide limits; usually it is about $\frac{1}{8}''$ to $\frac{1}{4}''$ in length. Of course, bulbous and similar articles may be produced in the same manner. The thickness of the walls may be varied as desired, but this method enables walls of considerable thickness to be built up, thereby affording the possibility of eradicating the minute blisters often present in fused quartz articles. After the article has thus been built up it is preferably reheated and blown. The resulting articles are clear, of uniform diameter and free from bubbles and rings or ridges.

What I claim as new and desire to secure by Letters Patent of the United States, is,—

1. The process of shaping refractory material which consists in applying a softened thread of said material with a reciprocating stroke on a foundation longitudinal to the growth of the article.

2. The process of making quartz tubes which consists in building up said tube by applying softened quartz at the end of said tube with a reciprocating stroke in the general direction of the axis of the tube and then working the tube in a softened condition to a desired shape.

In witness whereof, I have hereunto set my hand this twentieth day of November, 1912.

OTTO GREINER.

Witnesses:
JOHN A. McMANUS, Jr.,
ROBERT SHAND.

Copies of this patent may be obtained for five cents each, by addressing the "Commissioner of Patents, Washington, D. C."